US00RE33884E

United States Patent [19]

Kasuga et al.

[11] E Patent Number: Re. 33,884

[45] Reissued Date of Patent: Apr. 14, 1992

[54] UNDER SEAL ASSEMBLING STRUCTURE IN LINEAR GUIDE APPARATUS

[75] Inventors: Shinichi Kasuga, Maebashi; Nobuyuki Osawa, Takasaki, both of Japan

[73] Assignee: Nippon Seiko Kabushiki Kaisha, Tokyo, Japan

[21] Appl. No.: 553,127

[22] Filed: Jul. 12, 1990

Related U.S. Patent Documents

Reissue of:

[64] Patent No.: 4,921,358
Issued: May 1, 1990
Appl. No.: 360,215
Filed: Jun. 2, 1989

[51] Int. Cl.[5] ..... F16C 29/06; F16C 33/72

[52] U.S. Cl. ..... 384/15; 277/168; 384/45

[58] Field of Search ..... 384/15, 43–45; 277/168; 464/168

[56] References Cited

U.S. PATENT DOCUMENTS

| | | | |
|---|---|---|---|
| 3,400,987 | 9/1968 | Erikson | 384/15 |
| 4,253,709 | 3/1981 | Teramachi | 384/45 |
| 4,582,369 | 4/1986 | Itoh | 384/45 X |
| 4,595,244 | 6/1986 | Teramachi | 384/15 |
| 4,773,770 | 9/1988 | Osawa et al. | 384/45 |
| 4,810,104 | 3/1989 | Matsuoka | 384/45 |

*Primary Examiner*—Thomas R. Hannon
*Attorney, Agent, or Firm*—Basile and Hanlon

[57] ABSTRACT

Each of the pair of under seals which are respectively attached to the lower surfaces of the side walls of a slider includes an elongate core metallic plate and a rubber member secured to the core metallic plate and having a lip portion protruding inwardly from the inner edge of the core metallic plate. Each of the end caps attached to opposite ends of a slider main body is formed with an under seal holding groove in a joining surface of each leg portion of the end cap. The slider main body is formed with a stepped recess portion to accommodate the under seal in the lower surface of each side wall. The opposite ends of the under seal are fitted into and held in the under seal holding grooves of the end caps and the remainder of the under seal is accommodated in the stepped recess portion of the slider main body. The lip portion os the under seal is slidingly in contact with the lateral side of the guide rail to prevent dust from entering into the inside of the slider.

4 Claims, 3 Drawing Sheets

UNDER SEAL ASSEMBLING STRUCTURE IN LINEAR GUIDE APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a dust seal of a linear guide apparatus, and in particular, to an improvement in the assembling structure of an under seal in a linear guide apparatus.

2. Description of the Prior Art

Generally, a prior art linear guide apparatus, as shown in FIGS. 7 and 8, includes an axially extending guide rail 1 and a slider 2 movably straddling the guide rail 1. The guide rail 1 has ball rolling grooves 3 formed in both lateral sides in the axial direction, and the slider 2 has ball rolling grooves (not shown) formed in inner surfaces of both side walls 4 of a slider main body 2A so that the ball rolling grooves of the slider main body 2A respectively correspond to the ball rolling grooves 3 of the guide rail 1. Many balls are mounted rollably between opposing ball rolling grooves of the guide rail 1 and the slider main body 2A and the slider 2 moves on the guide rail 1 in the axial direction through the rolling of the balls. With this movement, it is necessary to continuously circulate the balls interposed between the guide rail 1 and the slider 2. To this end, a ball return path (not shown) is formed in each of the side walls 4 of the slider main body 2A penetrating axially and end caps 5 are provided at opposite ends of the slider main body 2A. A pair of curved paths each having a half-doughnut shape are formed in each of the end caps 5 so that the curved paths are in communication with the ball return paths respectively thereby to form ball infinitely circulating paths. However, dust or dirt particles are apt to be deposited on an upper surface 1a and on the ball rolling grooves 3 at lateral sides 1b of the guide rail 1. When the dust or dirt particles are left as they are, the smooth rolling balls in the slider 2 will be disturbed, and in turn, will degrade the travelling accuracy and the stopping position accuracy of the slider 2.

Accordingly, in order to prevent the intrusion of the dust into the slider 2, dust seals are provided to close gaps between the slider 2 and the guide rail 1.

The dust seals at each side of the linear guide apparatus include a side seal 6 and an under seal 7. The side seal 6 is composed of a core metallic plate of a substantially inverted U-shape, and a rubber member secured on the core metallic plate. The side seal 6 is attached to the outer side of the end cap 5 of the slider 2 so that lip portions formed at inner edge of the side seal 6 slide on the upper surface 1a and the side surfaces 1b of the guide rail 1 to seal the gaps at each axial end of the slider 2. The under seal 7 is a long plate made of rubber and is attached by rivets to a lower surface of each of the side walls 4 of the slider 2 so that a lip portion formed at the inner edge of the under seal 7 slides on the lateral side surface 1b of the guide rail 1.

In such a prior art dust seal in a linear guide apparatus, it is desirable to adjust the interference or surplus of the lip portions of the seal for tight contact depending on the environmental conditions including the shape, size and the amount of the dirt particles deposited on the surfaces of the guide rail, or the working conditions of the dust seal per se including the non-uniformity in dimensions of components of the dust seal and including the hardness, or the limit in wear during use and the sliding resistance of the lip portion.

However, in the prior art assembling structure of the under seal 7, the under seal 7 is secured directly to the flat lower surface of the slider main body 2A by the rivets 8. As a result the following problems have been encountered. (1) Once the under seal has been secured by the rivets, the adjustment of the interference becomes impossible, and when the interference is not proper, the under seal which has been assembled must be removed. However, since the under seal is damaged at the time of removing, the under seal once assembled must be disposed of. Thus, the part cost is increased. (2) The working cost for boring rivet holes in the slider main body 2A is required. (3) Man-hours are required for rivet driving work at the time of assembling the under seal and for rivet removing work in replacing the under seal. (4) Since the under seal is secured by the rivets, when the rivets are driven strongly, the under seal will be flattened or compressed excessively by the rivets. As a result, the end and intermediate portions of the under seal will be deformed into a wave shape, and gaps tend to be formed. Therefore, the sealing function will be degraded before the under seal is worn. (5) Since the under seal and the heads of the rivets are protruded downwardly from the lower surface of the slider, a superfluous attaching space is necessary. Moreover, the protruded under seal or the rivet heads may collide with other members, causing the under seal to deform or fall away.

SUMMARY OF THE INVENTION

It is an object of the present invention to solve the problems in the prior art structure, and to provide an under seal assembling structure of a fitting type without using rivets.

In an under seal assembling structure in a linear guide apparatus according to the present invention, wherein the linear guide apparatus includes a guide rail, a slider main body, end caps respectively attached to opposite ends of the slider main body, and a pair of under seals respectively provided on lower surfaces of side walls of the slider main body, each of the pair of under seals comprises an elongate core metallic plate extending in the axial direction of the slider main body, and a rubber member secured to the core metallic plate and having a lip portion protruding inwardly from an inner edge of the core metallic plate and elastic projections formed at longitudinal opposite ends of the rubber member. Each of the end caps is formed with a seal holding groove in a joining surface of each leg portion at which joining surface the end cap is joined to the slider main body, for receiving one axial end of the under seal inserted thereinto. Each of the side walls of the slider main body is formed with an under seal accommodating stepped portion which is recessed from the lower surface of the side wall so that the upper surface of the core metallic plate abuts against the upper inner surface of the seal accommodating stepped portion and the lip portion of the under seal is slidingly in contact with the lateral side surface of the guide rail.

In attaching the under seal, the end caps are secured to the slider main body, and before assembling the guide rail, each of the end portions of the under seal is inserted into the seal holding groove formed in the joining surface of the end cap by pushing from the inner side of the slider facing the guide rail in a lateral direction. The under seal is held stably in the seal accommodating groove due to an elastic force and a frictional force of the elastic projection formed protrudingly at each end portion of the under seal and, thus, the under seal can be attached simply by pushing. The attached under seal is accommodated in the under seal accommodating stepped portion formed in the lower surface of each side wall of the slider main body and does not protrude outwardly from the lower surface of the slider main body.

Furthermore, the core metallic plate of the under seal has rigidly even when it is a thin plate since a bend portion is formed, and the deformation of the intermediate portion of the under seal is prevented.

In order to make the under seal abut against the guide rail, after the guide rail has been assembled to the slider, the under seal is drawn out towards the lateral side of the guide rail against the elastic force and the frictional force of the elastic projection held in the seal holding groove of the end cap and adjusted so that the lip portion is closely in contact with the guide rail.

In removing the under seal, after the guide rail is disassembled from the slider, it is only necessary to draw out the end portion of the under seal in the inward direction horizontally from the seal accommodating groove.

BRIEF DESCRIPTION OF THE DRAWINGS

The figures of the drawing show an embodiment of the present invention in which.

DESCRIPTION OF THE PREFERRED EMBODIMENT

Figure 1:
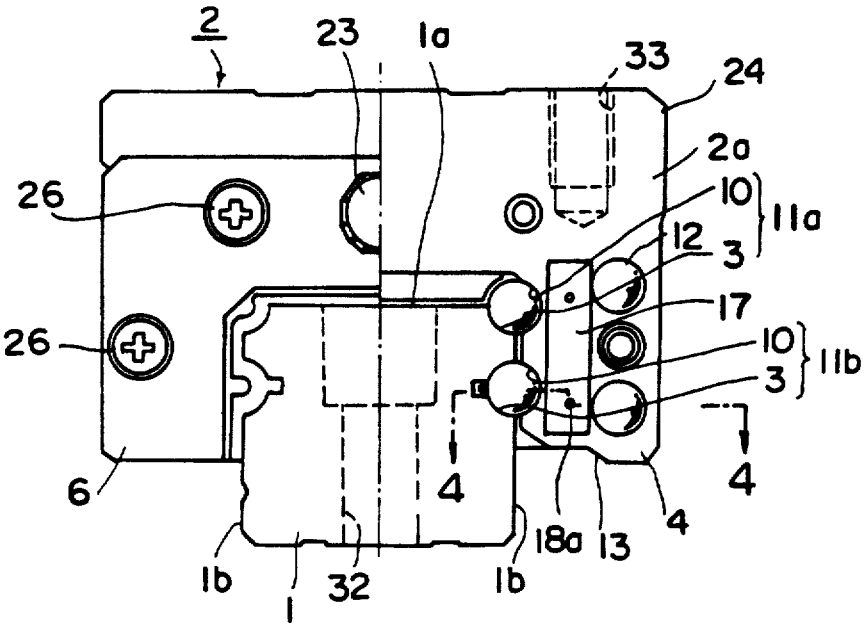
FIG. 1 is a front view of a linear guide apparatus with a half part of an end cap cut away.

FIGS. 1 to 6 show an embodiment of the present invention. In the figures, identical or corresponding parts to those in the prior art are designated by identical reference numerals.

A slider main body 2A of a slider 2 movably straddles a guide rail 1 which has axial ball rolling grooves 3 extending in an axial direction in both lateral sides. The slider main body 2A has a cross section of an inverted U-shape, and has two pairs of upper and lower ball rolling grooves 10 respectively formed in inner surfaces of both side walls 4 so that the two pairs of ball rolling grooves 10 of the slider main body 2A respectively correspond to the two pairs of ball rolling grooves 3 of the guide rail 1. In this case, each pair of upper ball rolling grooves 3 and 10 form an upper ball rolling path 11a, and each pair of lower ball rolling grooves 3 and 10 form a lower ball rolling path 11b. Furthermore, each side wall 4 of the slider main body 2A has upper and lower ball return paths 12 penetrating axially in parallel with the upper and lower ball rolling paths 11a, 11b.

Each side wall 4 of the slider main body 2A has an under seal accommodating stepped portion 13 formed in the lower surface of the side wall 4. The under seal accommodating stepped portion 13 is formed as a one-stepped recess in the lower surface at the inner side thereof extending axially over the whole length of the slider main body 2A.

Figure 2:
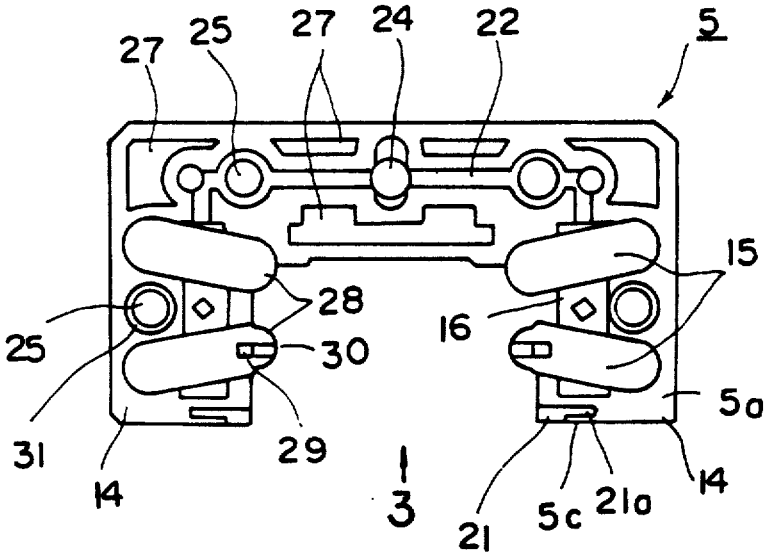
FIG. 2 is a rear view of the end cap.

The end caps 5, FIG. 2, respectively joined to axial opposite ends of the slider main body 2A are injection molded products made of synthetic resin, and have a cross section of an inverted U-shape similar to that of the slider main body 2A. Each end cap 5 has upper and lower semicircular recesses 15 formed in an abutting surface 5a of each leg portion 14, which abutting surface 5a abuts against the end surface 2a of the slider main body 2A. Furthermore, a semi-column shaped groove 16 is formed in the surface 5a to vertically cross the center portions of the upper and lower semicircular recesses 15. A return guide 17, FIG. 1, having a semi-cylindrical shape is fitted into the semi-column shape groove 16 to form a curved path 20, FIG. 4, having a half-doughnut shape. The return guide 17 has an oil passage groove 18 which extends vertically and is defined by an inner surface of the semi-cylindrical return guide 17, and also has an oil passage aperture 18a which is in communication with the oil passage groove 18 and has an opening at the peripheral surface.

Each half-doughnut shaped curved path 20 brings the ball rolling path 11 in communication with the ball return path 12. As a result, an infinitely circulating route is formed by the ball rolling path 11, ball return path 12, and curved path 20. Many balls B are mounted in this infinitely circulating route as shown in FIG. 4.

Figure 3:
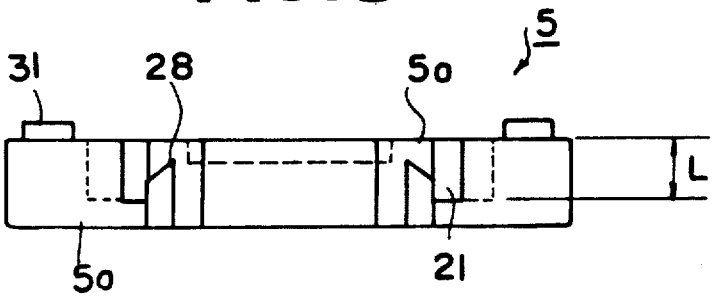
FIG. 3 is an underside view as viewed from the arrow 3 in FIG. 2.

Each end cap 5 structured as described above is further formed with an under seal holding groove 21 in a bottom surface 5c of each leg portion 14, FIGS. 2 and 3. The under seal holding groove 21 is formed by cutting out a portion of the bottom surface 5c at a position near an inner edge of the leg portion 14 so that the shape and size of the groove 21 matches a cross section of an under seal 40 which will be described later. The under seal holding groove 21 has a depth L in a thickness direction of the end cap 5 from the joining surface 5a.

Furthermore, in each end cap 5, an oil feed groove 22 is formed in the joining surface 5a which is in communication with the oil passage groove 18 of the return guide 17, and with a fixing aperture 24 of an oil feed nipple 23. Reference numeral 25 designates a through bore for a fixing screw 26 for securing the end cap 5 to the slider main body 2A, and reference numeral 27 designates recesses distributed in land portions for reducing the thickness of the end cap 5.

Figure 4:
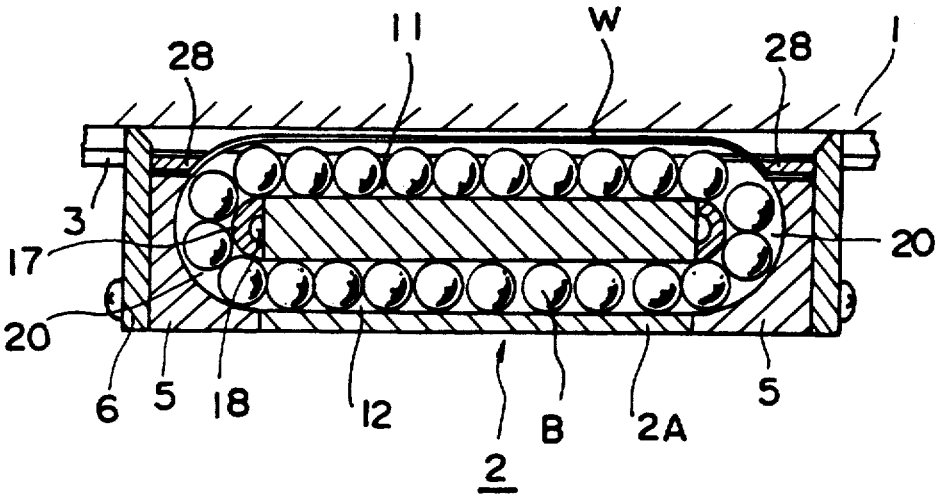
FIG. 4 is a sectional view taken along the line 4—4 in FIG. 1.

Furthermore, the curved path 20 of the end cap 5 has a protruding portion of a semicircular shape at an inner side which guides the rolling balls B outwardly as shown in FIGS. 2 to 4. A tip end of the protruding portion forming an acute angle has a ball scooping projection 28 which is adapted to be fitted into the ball rolling groove 3 of the guide rail 1. Moreover, the ball scooping projection 28 of the lower curved path 20 is formed with a holding aperture 29 for holding an end portion of a wire retainer W which is inserted axially into the holding aperture 29, as well as a holding groove 30 which is in communication with the holding aperture 29 from the tip of the ball scooping projection 28. Besides the retainer formed by a wire, a retainer may be formed by press forming a plate so that a square cross section is formed having high rigidity.

Reference numeral 31 designates a guide protrusion formed on the joining surface 5a of the end cap 5 to insure the joining accuracy with respect to the slider main body 2A. A fixing screw through bore 25 is formed penetrating the end cap 5.

Furthermore, in FIG. 1, reference numeral 32 designates a through bore for a bolt to secure the guide rail 1 to a base or the like with which the linear guide apparatus is to be used, and reference numeral 33 designates a screw bore for a bolt to secure a driven member such as a table or the like to the slider 2.

Figure 5:
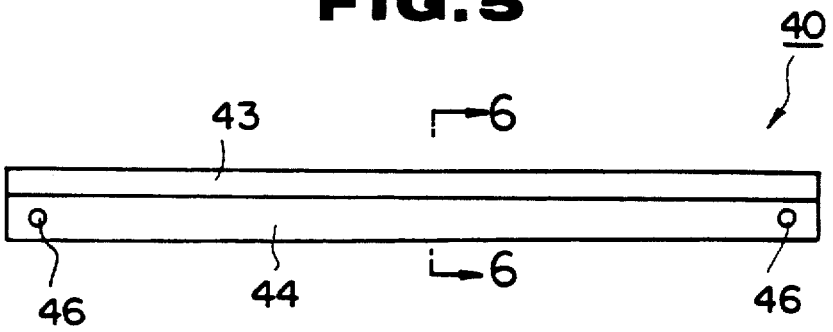
FIG. 5 is an underside view of an under seal.
Figure 6:
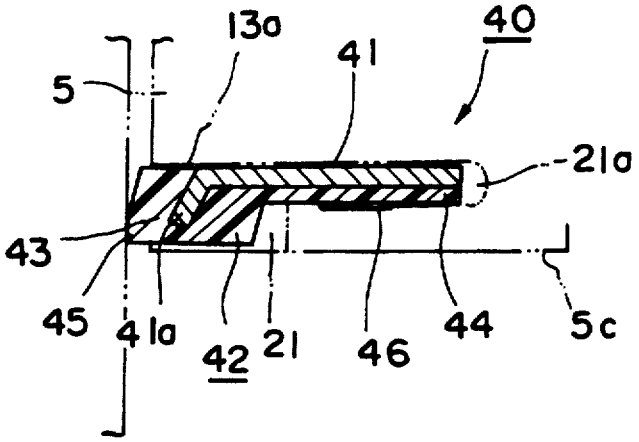
FIG. 6 is a sectional view taken along the line 6—6 in FIG. 5.
Figure 7:
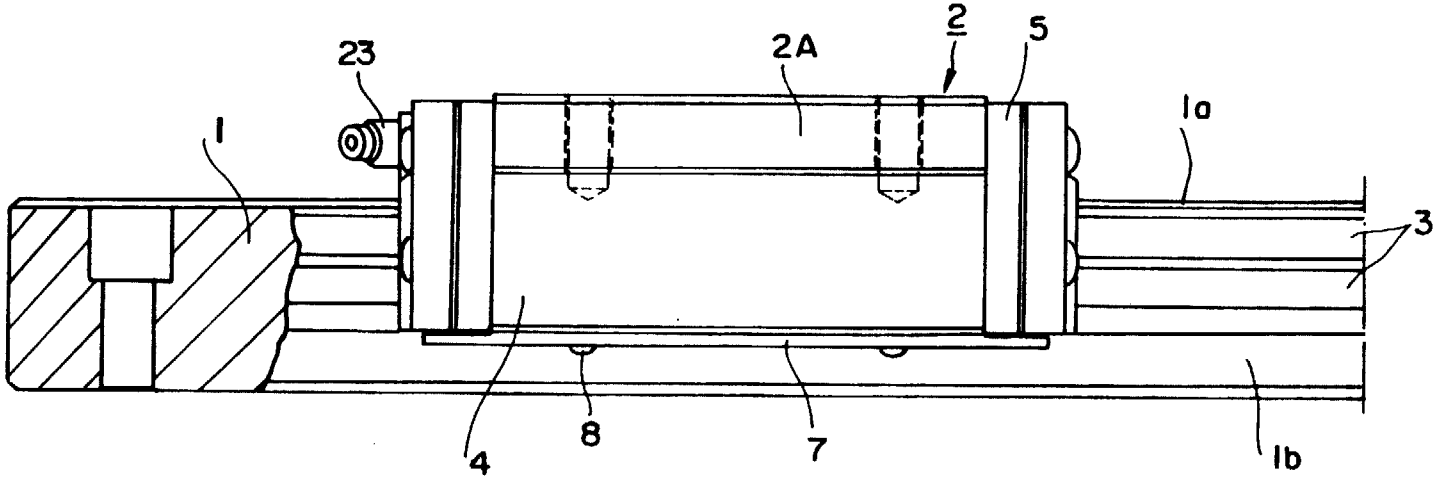
FIG. 7 (PRIOR ART)
FIG. 7 is a side view of a linear guide apparatus which uses a prior art under seal.
Figure 8:
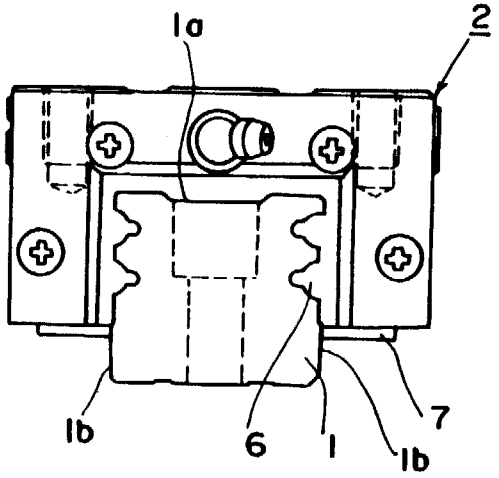
FIG. 8 (PRIOR ART)
FIG. 8 is a front view of the linear guide apparatus shown in FIG. 7.

FIGS. 5 and 6 show the under seal 40. The under seal 40 has a whole length somewhat longer than the length of the slider main body 2A, and has a width somewhat wider than a groove width of the under seal accommodating stepped portion 13. The under seal 40 is formed of a core metallic plate 41 which abuts against a step surface 13a of the seal accommodating stepped portion 13, and a rubber member 42 which is integrally bonded to the core metallic plate 41 by heat bonding or the like. The rubber member 42 includes a thick wall portion 43 for enclosing a bent outer edge portion 41a of the core metallic plate 41, and a thin wall portion 44 for covering one surface of a base portion of the core metallic plate 41. A lip portion 45 is formed at the tip end of the thick wall portion 43 which is in sliding contact with the lateral side 1b of the guide rail 1. Moreover, elastic projections 46 are respectively formed at longitudinal end portions of the thin wall portion 44 of the rubber member 42 to protrude slightly outwardly.

Next, the operation of the embodiment of the present invention will be described.

In assembling the under seal 40 to the slider 2, after the end caps 5 have been secured to the slider main body 2A, each end portion of the under seal 40 is inserted into the under seal holding groove 21 simply by pushing in a lateral direction from the inner side facing the guide rail 1. As a result, the base portion of the core metallic plate 41 and the elastic projections 46 of the thin wall portion 44 of the rubber member 42 are fitted into the narrow groove space 21a of the under seal holding groove 21. The end portions of the under seal 40 are tightly and reliably held in the under seal holding grooves 21 owing to an elastic force and a frictional force of the elastic projections 46.

Accordingly, the under seal 40 is held in the end caps 5 at the opposite end portions of the under seal 40, and at the same time, the under seal 40 is accommodated in the accommodating stepped portion 13 of the slider main body 2A so that the under seal 40 does not protrude or extend outwardly therefrom.

Moreover, since the core metallic plate 41 of the under seal 40 is closely in contact with the grooved surface of the under seal holding groove 21 due to the elastic force of the elastic projections 46, the rigidity of the core metallic plate 41 is increased to a great extent by the bent outer edge portion 41a. As a result, deformation of the intermediate portion of the under seal 40 is prevented.

Upon mounting the assembled slider 2 to the guide rail 1, the lip portion 45 of the under seal 40 abuts against the lateral side 1b of the guide rail 1, and the gap between the guide rail 1 and the lower portion of the slider 2 is completely sealed.

When the lip portion 45 of the under seal 40 is worn due to the repetition of reciprocating movements, and when insufficient interference for sealing with respect to the lateral side 1b of the guide rail 1 is caused, it is possible to adjust the interference by drawing out the under seal 40 towards the lateral side 1b of the guide rail 1 against the elastic force and the frictional force of the elastic projections 46 held in the under seal holding grooves 21 of the end caps 5.

In removing the under seal 40, the slider 2 is disassembled from the guide rail 1, and it is only necessary to draw out the end portions of the under seal 40 from the under seal holding grooves 21 inwardly in the horizontal direction.

As described in the foregoing, in an under seal assembling structure in a linear guide apparatus according to the invention, each end cap has an under seal holding groove formed in a joining surface of each leg portion for receiving an end portion of the under seal inserted thereinto, which joining surface is joined to the slider main body and the slider main body has an under seal accommodating stepped portion extending axially and formed in the bottom surface of each side wall of the slider main body. On the other hand, the under seal includes a core metallic plate whose upper surface abuts against the upper inner surface of the under seal holding groove accommodating stepped portion and includes a rubber member bonded to the core metallic plate. The rubber member has a lip portion protruding inwardly from an outer edge of the core metallic plate and elastic projections formed at longitudinal end portions of the rubber member and protruding downwardly. As a result, the rivets used in attaching the under seal in the prior art becomes unnecessary, and the following advantages are provided. (1) The attaching and removing of the under seal can be performed in a simple manner, and the working, assembling, and replacing costs can be reduced to a great extent. (2) The adjustment of the interference can be effected by applying an external force to the under seal in a direction to push or draw out the under seal against the elastic force and the frictional force of the elastic projections. As a result, the under seal can be used repeatedly even when it is worn. (3) The under seal is accommodated in the under seal accommodating stepped portion and does not extend outwardly of the slider main body. Thus, space for the under seal is saved. Furthermore, the under seal is not deformed due to collision with other members, so as to stabilize the sealing property of the under seal.

What is claimed is:

1. In an under seal assembling structure in a linear guide apparatus, wherein said linear guide apparatus includes a guide rail, a slider having a slider main body and end caps attached to opposite ends of said slider main body respectively, and a pair of under seals respectively provided on lower surfaces of side walls of said slider main body, the improvement in which each of said pair of under seals comprises:

an elongate core metallic plate extending in the axial direction of said slider main body, and a rubber member secured to said core metallic plate and having a lip portion protruding inwardly from an inner edge of said core metallic plate and elastic projections formed at longitudinal opposite end portions of said rubber member protruding slightly outwardly therefrom; and further comprising:

each of said end caps formed with an under seal holding groove in a joining surface of each leg portion of said each end cap, said joining surface being joined to said slider main body, said under seal holding groove receiving one axial end of said under seal inserted thereinto; and each of the side walls of said slider main body formed with an under seal accommodating stepped portion which is recessed from a lower surface of the side wall so that an upper surface of said core metallic plate abuts against an upper inner surface of said under seal accommodating stepped portion and the lip portion of said under seal is slidingly in contact with a lateral side of said guide rail.

*2. In an under seal assembling structure in a linear guide apparatus, wherein said linear guide apparatus includes a guide rail, a slider having a slider main body and end caps attached to opposite ends of said slider main body respectively, and a pair of under seals respectively provided on lower surfaces of side walls of said slider main body, the improvement in which each of said pair of under seals comprises:*

*an elongate core metallic plate extending in the axial direction of said slider main body, and a rubber member secured to said core metallic plate and having a lip portion protruding inwardly from an inner edge of said core metallic plate and elastic projections formed at longitudinal opposite end portions of said rubber member protruding slightly outwardly therefrom; and further comprising:*

*each of said end caps formed with an under seal holding groove in a joining surface of each leg portion of said each end cap, said joining surface being joined to said slider main body, said under seal holding groove receiving one axial end of said under seal inserted thereinto, said lip portion of said under seal slidingly in contact with a lateral side of said guide rail.*

*3. The under seal assembling structure in a linear guide apparatus as defined in claim 2 wherein each of the side walls of said slider main body is formed with an under seal accommodating portion which engages an upper surface of said core metallic plate.*

*4. In an under seal assembling structure in a linear guide apparatus, wherein said linear guide apparatus includes a guide rail, a slider having a slider main body and end caps attached to opposite ends of said slider main body respectively, and a pair of under seals respectively provided on lower surfaces of side walls of said slider main body, the improvement in which each of said pair of under seals comprises:*

*an elongate core metallic plate extending in the axial direction of said slider main body, and a rubber member secured to said core metallic plate and having a lip portion protruding inwardly from an inner edge of said core metallic plate and elastic projections formed at longitudinal opposite end portions of said rubber member protruding slightly outwardly therefrom; and further comprising:*

*each of said end caps formed with an under seal holding groove in a joining surface of each leg portion of said each end cap, said joining surface being joined to said slider main body, said under seal holding groove receiving one axial end of said under seal inserted thereinto; and*

*each of the side walls of said slider main body formed with an under seal accommodating portion formed on a lower surface of the side wall so that an upper surface of said core metallic plate abuts against an upper inner surface of said under seal accommodating portion, and the lip portion of said under seal is slidingly in contact with a lateral side of said guide rail.*

* * * * *